(12) United States Patent
Jin et al.

(10) Patent No.: US 8,559,454 B2
(45) Date of Patent: *Oct. 15, 2013

(54) CQICH ALLOCATION REQUEST HEADER FOR COMMUNICATING FEEDBACK INFORMATION

(75) Inventors: Yong-Suk Jin, Anyang (KR); Bin-Chul Ihm, Anyang (KR); Jin-Young Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

This patent is subject to a terminal disclaimer.

(21) Appl. No.: 13/244,274

(22) Filed: Sep. 23, 2011

(65) Prior Publication Data

US 2012/0014340 A1   Jan. 19, 2012

Related U.S. Application Data

(63) Continuation of application No. 12/486,711, filed on Jun. 17, 2009, now Pat. No. 8,050,286, which is a continuation of application No. 11/375,181, filed on Mar. 13, 2006, now Pat. No. 7,630,391.

(60) Provisional application No. 60/663,214, filed on Mar. 17, 2005, provisional application No. 60/677,687, filed on May 3, 2005.

(30) Foreign Application Priority Data

Mar. 12, 2005 (KR) .................. 10-2005-0020831
Apr. 26, 2005 (KR) .................. 10-2005-0034477

(51) Int. Cl.
*H04L 12/28*   (2006.01)
(52) U.S. Cl.
USPC .......................................... 370/431; 370/468

(58) Field of Classification Search
USPC ......... 370/389, 392, 400–401, 431–432, 465, 370/468
See application file for complete search history.

(56) References Cited

U.S. PATENT DOCUMENTS 6,091,954 A   7/2000   Haartsen et al.
6,337,850 B1   1/2002   Nakano et al.
(Continued)

FOREIGN PATENT DOCUMENTS

EP   1458118   9/2004
GB   2357017   6/2001
(Continued)

OTHER PUBLICATIONS

Bin-Chul Ihm, et al. "Extension of Collaborative Spatial Multiplexing in OFDMA"; IEEE C802.16e-04/286r2, IEEE 802.16 Broadband Wireless Access Working Group [Online], Aug. 29, 2004 <URL: http://www.ieee802.org/16/tge/contrib/C80216e-04_286r2.pdf>, 5 pages.

(Continued)

*Primary Examiner* — Kevin Mew
(74) *Attorney, Agent, or Firm* — Lee, Hong, Degerman, Kang & Waimey (57) ABSTRACT

A method of communicating feedback information between a mobile station and a base station comprises determining a need to request bandwidth allocation; providing information to a base station according to the determining, wherein the information indicates bandwidth allocation for a fast feedback channel; and performing communication with the base station upon bandwidth allocation according to the provided information.

14 Claims, 7 Drawing Sheets

(56) References Cited

U.S. PATENT DOCUMENTS

| | | | |
|---|---|---|---|
| 6,529,734 B1 | 3/2003 | Lagneborg et al. | |
| 6,567,418 B1 | 5/2003 | Farah | |
| 6,747,959 B1 | 6/2004 | Ho | |
| 6,799,043 B2 | 9/2004 | Tiedemann, Jr. et al. | |
| 7,630,391 B2 | 12/2009 | Jin et al. | |
| 7,756,099 B2 * | 7/2010 | Tao et al. | 370/344 |
| 8,107,986 B2 * | 1/2012 | Cho et al. | 455/522 |
| 8,144,731 B2 * | 3/2012 | Khandekar et al. | 370/468 |
| 2003/0162511 A1 | 8/2003 | Kim et al. | |
| 2004/0002364 A1 | 1/2004 | Trikkonen et al. | |
| 2004/0013103 A1 * | 1/2004 | Zhang et al. | 370/345 |
| 2004/0203991 A1 | 10/2004 | Chen et al. | |
| 2005/0208945 A1 | 9/2005 | Hong et al. | |
| 2006/0025079 A1 | 2/2006 | Sutskover et al. | |
| 2006/0146856 A1 * | 7/2006 | Jung et al. | 370/431 |
| 2006/0171417 A1 | 8/2006 | Ihm et al. | |
| 2006/0208945 A1 | 9/2006 | Kolanek | |
| 2007/0041378 A1 * | 2/2007 | Ihm et al. | 370/389 |
| 2007/0115862 A1 * | 5/2007 | Lee et al. | 370/260 |
| 2007/0206623 A1 * | 9/2007 | Tiedemann et al. | 370/431 |
| 2007/0211757 A1 * | 9/2007 | Oyman | 370/468 |
| 2007/0274253 A1 | 11/2007 | Zhang et al. | |
| 2009/0088173 A1 | 4/2009 | Motegi et al. | |
| 2010/0008320 A1 | 1/2010 | Yeo et al. | |
| 2010/0039994 A1 | 2/2010 | Yi et al. | |

FOREIGN PATENT DOCUMENTS

| | | |
|---|---|---|
| KR | 1020060019480 | 3/2006 |
| KR | 1020060039804 | 5/2006 |
| KR | 1020060060382 | 6/2006 |
| KR | 1020060081887 | 7/2006 |
| TW | 425791 | 3/2001 |
| TW | 490953 | 6/2002 |
| TW | 588535 | 5/2004 |
| TW | 595179 | 6/2004 |
| WO | 03010984 | 2/2003 |
| WO | 2004-004173 | 1/2004 |

OTHER PUBLICATIONS

Yaniv, R. et al.; "Corrections to Definitions of Uplink MIMO in OFDMA PHY", IEEE C802.16maint-04/68r2, IEEE 802.16 Broadband Wireless Access Working Group [online], Jan. 14, 2005, <URL:http://ieee802.org/16/maint/contrib/C80216maint-04_68r2.pdf>, 6 pages.

Baum, K. et al. "Number of Receive and Transmit Antenna Capability for AAS Enabled MSS", IEEE C802.16e-04/536, IEEE 802.16 Broadband Wireless Access Working Group [online], Nov. 4, 2004. <URL:http:/www.ieee802.org/16/tge/contrib/C80216e-04_536.pdf>, 2 pages.

Institute of Electrical and Electronics Engineering (IEEE), "Part 16: Air Interface for Fixed Broadband Wireless Access Systems," 802.16 IEEE Standard for Local and Metropolitan Area Networks, Oct. 2004, 8 pages.

Korean Intellectual Property Office Application Serial No. 10-2006-0022852, Notice of Allowance dated Nov. 20, 2012, 2 pages.

"IEEE Standard for Local and metropolitan area networks; Part 16: Air Interface for Fixed Broadband Wireless Access Systems," IEEE Std 802.16m-2004, Oct. 2004, XP-002538626.

IEEE Standard for Local and Metropolitan Area Networks, "Part 16: Air Interface for Fixed Broadband Wireless Access Systems," IEEE Std 802.16, Oct. 2004.

United States Patent and Trademark Office U.S. Appl. No. 11/908,406, Office Action dated Jul. 15, 2013, 9 pages.

* cited by examiner

| Period (=p) | 3 | A CQI feedback is transmitted on the CQICH every $2^P$ frames |
|---|---|---|
| CQICH_Num | 4 | Number of CQICHs assigned to this CQICH-ID is (CQICH_Num + 1) |
| for (i=0;i<CQICH_Num+1;i++) { | | |
| Feedback Type | 3 | 000= Fast DL measurement/Default Feedback with antenna grouping<br>001= Fast DL measurement/Default Feedback with antenna selection<br>010= Fast DL measurement/Default Feedback with reduced code book<br>011= Quantized precoding weight feedback<br>100= Index to precoding matrix in codebook<br>101= Channel Matrix Information<br>110= Per stream power control<br>111= Reserved |

FIG. 7

| Syntax | Size | Notes |
|---|---|---|
| FAST-FEEDBACK allocation Subheader { | | |
| Allocation offset | 6 bits | |
| Feedback Type | 2 bits | 00= Fast DL measurement<br>01= Fast MIMO feedback; antenna #0<br>10= Fast MIMO feedback; antenna #1<br>11= MIMO mode and permutation mode feedback |
| } | | |

| Feedback Type | Feedback Contents | Description |
|---|---|---|
| 000 | DL measurement | SNR value of DL signal |
| 001 | MIMO mode | Request MIMO mode and permutation |
| 010 | Anchor BS report | Include new anchor BS into Active set |
| 011 | Period request | Report period requested by MS |
| 100 | Antenna grouping | |
| 101 | Antenna selection | |
| 110 | Precoding marix codebook | |
| 111 | Reserved | Weight value or number of streams for cclosed-loop MIMO |

FIG. 11

| Value (binary) | Description |
|---|---|
| 100000 | Anchor BS for TEMP_BS_ID=000 |
| 100001 | Anchor BS for TEMP_BS_ID=001 |
| 100010 | Anchor BS for TEMP_BS_ID=010 |
| 100011 | Anchor BS for TEMP_BS_ID=011 |
| 100100 | Anchor BS for TEMP_BS_ID=100 |
| 100101 | Anchor BS for TEMP_BS_ID=101 |
| 100110 | Anchor BS for TEMP_BS_ID=110 |
| 100111 | Anchor BS for TEMP_BS_ID=111 |

FIG. 12

| Feedback Type | Feedback Contents |
|---|---|
| 000 | DL measurement/antenna grouping |
| 001 | DL measurement/antenna selection |
| 010 | DL measurement/Precoding matrix codebook |
| 011 | Quantized precoding weight feedback |
| 100 | Index to precoding matrix in codebook |
| 101 | Channel Matrix Information |
| 110 | Per stream power control |
| 111 | Reserved |

FIG. 13

| ESF Type value | Name | Length (bytes) |
|---|---|---|
| 0 | SDU_SN subheader | 1 |
| 1 | DL Sleep control subheader | 3 |
| 2 | Feedback request subheader | 3 |
| 3 | MIMO mode feedback subheader | 1 |
| 4 | UL TX power report subheader | 1 |
| 5 | Mini-Feedback subheader | 2 |
| 6 | CQICH allocation request subheader | 1 |
| Bits #7~127 | Reserved | |

FIG. 14

| Name | Size (bits) | Description |
|---|---|---|
| Feedback Type | 3 | (see Fig. 10) |
| Period | 2 | Request desired report period |
| Reserved | 3 | Set to '0' |

CQICH ALLOCATION REQUEST HEADER FOR COMMUNICATING FEEDBACK INFORMATION

CROSS REFERENCE TO RELATED APPLICATIONS

This application is a continuation of U.S. application Ser. No. 12/486,711, filed Jun. 17, 2009, now U.S. Pat. No. 8,050,286, which is a continuation of U.S. application Ser. No. 11/375,181, filed Mar. 13, 2006, now U.S. Pat. No. 7,630,391, which claims the benefit of earlier filing date and right of priority to Korean Application No. 10-2005-20831, filed Mar. 12, 2005, Korean Application No. 10-2005-34477, filed Apr. 26, 2005, Provisional Application No. 60/663,214, filed on Mar. 17, 2005 and Provisional Application No. 60/677,687, filed on May 3, 2005, the contents of all of which are hereby incorporated by reference herein in their entireties.

FIELD OF THE INVENTION

One embodiment of the present invention relates to mobile communications, and more particularly, to a method of communicating feedback information between a mobile station and a base station by using a CQICH allocation request header.

BACKGROUND ART

Figure 1:
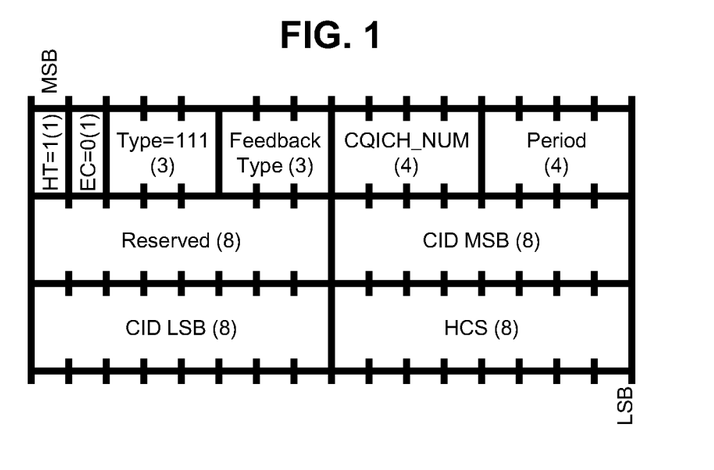
FIG. 1 shows an example of a header structure according to one embodiment of the present invention.

In a related art Orthogonal Frequency Division Modulation (OFDM) Time Division Duplex (TDD) system, Medium Access Layer (MAC) Protocol Data Units (PDUs) may be broadly categorized as MAC Management PDUs and user data MAC PDUs. A MAC Management PDU is comprised of a payload containing previously agreed upon MAC management messages for operation of the MAC layer, and a MAC header attached in front of each payload. A Bandwidth Request PDU, which is needed for a user to dynamically request necessary bandwidth on the uplink, is a special type of MAC Management PDU having only a header (that is referred to as a Bandwidth Request Header) without any payload attached thereto. FIG. 1 shows the configuration of a related art Bandwidth Request Header.

According to the related art, a bandwidth request function is a procedure used when a mobile station informs a base station that uplink bandwidth allocation is necessary. The bandwidth request may be of an incremental type or an aggregation type. The base station that receives an incremental bandwidth request, must add bandwidth necessary matters to the currently allocated bandwidth, to accommodate the size of the requested bandwidth related to a corresponding connection (or access procedure). Alternatively, upon receiving a group type request, the base station should replace the previous bandwidth of the corresponding connection with the size of the requested bandwidth.

In addition to the above functions, the header can be used to perform other functions. Such functions are classified according to a type field at the front portion of the header, and the contents to be transferred correspond according to the type field. Basically, this is used to transfer other values when requesting bandwidth. For example, if the type field is 010, an uplink transmit power value is reported, and if the type field is 100, a downlink burst profile change is requested. A type field of 101 can be used to transfer a power saving class ID for sleep mode. As such, in addition to requesting bandwidth, the header can be used to report other information together with simultaneously requesting bandwidth.

In the related art, the request from the mobile terminal is limited to requesting uplink bandwidth. Also, allocation of a Fast-feedback channel (e.g., CQICH) that allows quick transferring of various feedback values was received only based according to an allocation from the base station. When the base station requests feedback values upon allocation of a CQICH region to the mobile terminal, a CQICH_Enhanced_allocation Information Element (IE), a CQICH-allocation IE or if data exists, a Fast-feedback allocation sub-header is used for informing. Only the mobile terminal that received a request through such IE or sub-header then calculates the requested feedback value and reports such thereof. Accordingly, reporting a most recent downlink channel state (condition) value of the mobile terminal with a request from the base station, changing into MIMO mode for channel improvement (enhancement) in a multiple antenna system, and other such procedures cannot be requested from the mobile terminal itself. Also, channel state (condition) report values that are reported at a report period (interval) that was determined in a uni-lateral (one-sided) manner without considering the mobility characteristics of the mobile terminal may become useless.

SUMMARY

One aspect of the present invention involves the recognition by the present inventors of the drawbacks in the related art, as explained above. Based upon such recognition, improvements to a CQICH allocation request procedure have been made according to one embodiment of the present invention.

One feature of the present invention is to allow not only a request for uplink resource allocation, but also a request for resource allocation for a CQICH channel (i.e., a fast feedback channel) through use of a bandwidth request header having a particular configuration. Also, if an instruction to provide periodic feedback reports is received from the base station, a request for report period modification is also possible. Namely, the present invention modifies the structure (i.e., configuration, construction, etc.) of the related art bandwidth request header such that it can be used for requesting allocation of necessary CQICH resources according to the type of feedback to be sent by the mobile terminal, and also for requesting the desired feedback report period. Also, the bandwidth request header according to one embodiment of the present invention can be constructed to be used for requesting a change in the feedback report period that had been previously set by the base station.

More specifically, the present invention provides a method of communicating feedback information between a mobile station and a base station by determining a need to request bandwidth allocation; providing information to a base station according to the determining, wherein the information indicates bandwidth allocation for a fast feedback channel, which is a robust channel; and performing communication with the base station upon bandwidth allocation according to the provided information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF EXEMPLARY EMBODIMENTS

The present invention is described as being implemented in a 3GPP2 type mobile communications system that supports OFDM/OFDMA and/or WiMax. However, the features of the present invention may also be adapted and implemented in communications systems operating under other types of communication specifications (e.g., 3GPP, 4G, IEEE, OMA, etc.), because the concepts and teachings of the present invention could be applied to various communication schemes that operate in a similar manner based upon common techniques.

The present invention in one embodiment will refer to communications between mobile stations and base stations, merely for the sake of convenience. However, mobile stations may be referred to using other similar terms (e.g., mobile terminals, user equipment, etc.), and base stations may also be referred to using other similar terms (e.g., Node Bs, network access points, etc.).

Also, the present invention in one embodiment will be in the context of broadcast/multicast services (BCMCS), but the features of the present invention may apply to various types of point-to-multipoint services that provide multimedia data to users, such as multimedia broadcast/multicast service (MBMS), media broadcasting, contents delivery, and the like.

Non-limiting exemplary embodiments of the present invention are explained below with reference to the attached Figures.

1. Header Structure

Figure 2:
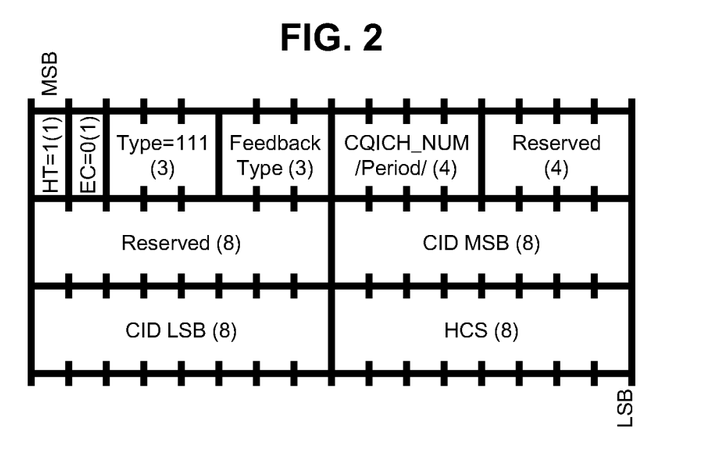
FIG. 2 shows another example of a header structure according to one embodiment of the present invention.

FIGS. 1 and 2 show examples of a header according to one embodiment of the present invention. Namely, a new type field is defined in the related art bandwidth request header used for requesting an uplink bandwidth in order to indicate that a Fast-feedback channel is to be requested. The header according to one embodiment of the present invention to allow the mobile terminal itself to indicate the type of data to be fed back (i.e., see Table 1 to be explained hereafter) and to request the necessary bandwidth (e.g., CQICH_Num). Here, the desired feedback report period can also be included.

Figure 3:
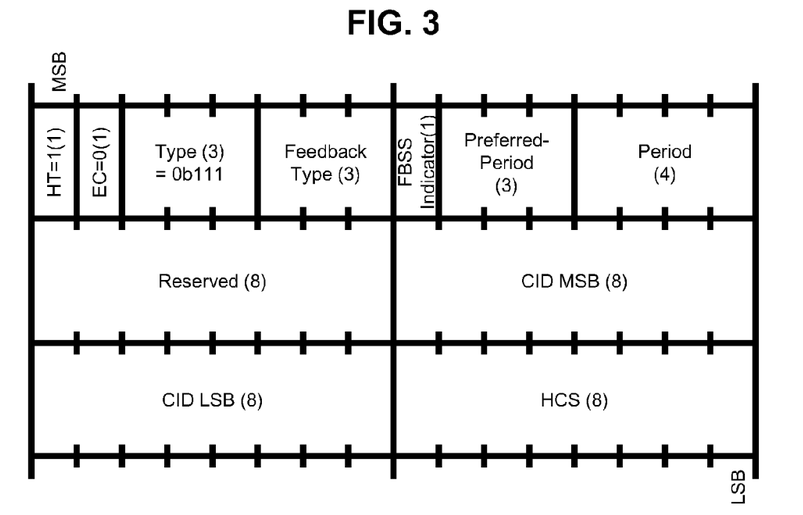
FIG. 3 shows another example of a header according to one embodiment of the present invention that can be used for requesting Fast Base Station Switching (FBSS), requesting a report of general feedback values, and a preferred period.

FIG. 3 shows another example of a header according to one embodiment of the present invention that can be used for requesting Fast Base Station Switching (FBSS), requesting a report of general feedback values, and a preferred period. For indicating the FBSS function, a field that is separate from the feedback type is employed. This header structure may also be used to request a change of the feedback report period that was previously set by the base station.

2. Operation

For the base station to quickly receive Fast-feedback values on the uplink bandwidth, a Fast-feedback channel (e.g., CQICH) is employed. This channel may be used to distinguish delivered values according to the type of signal that indicates a unique value, without having to perform a decoding/encoding procedure. The amount of data that can be delivered via this channel may be 4 or 6 bits. In the case of 4 bits, a reported feedback value can be represented by using 16 slots. In the case of 6 bits, a total of 64 feedback values can be represented. The mobile station can know of its location within a certain region through the receipt of a UIUC=0 or a Fast-feedback channel IE (information element) from the base station.

Figure 4:
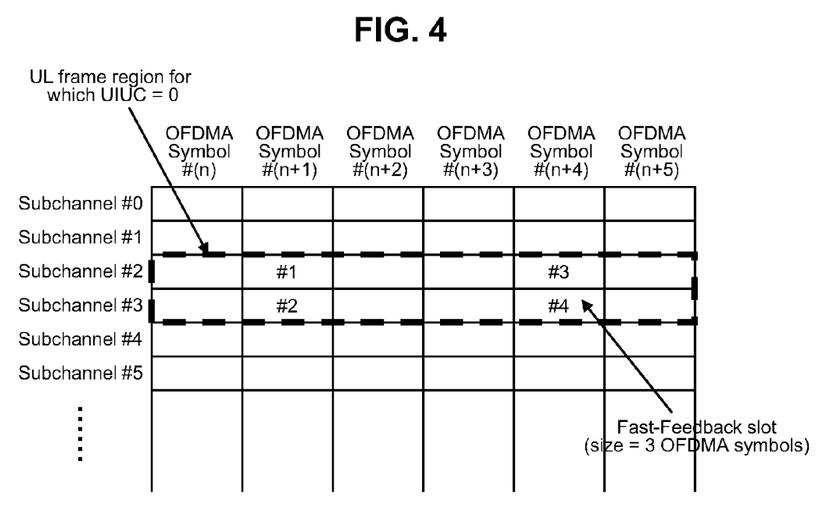
FIG. 4 depicts a Fast-feedback channel configuration for an uplink bandwidth, in accordance with one embodiment.

FIG. 4 depicts a Fast-feedback channel configuration for an uplink bandwidth. The bandwidth allocation to be used for each mobile station within a region and the feedback value to be requested are informed through use of a CQICH_allocation IE or a CQICH_Enhanced_alloc IE, and if there is data to be sent to the mobile terminal, a Fast-feedback allocation subheader is used. In situations other than the case for using the subheader, the period for reporting feedback information is also decided.

For a mobile terminal that does not have a feedback value report request using the above-described methods, the feedback type and report period desired by that mobile terminal are set and requested through the use of a CQICH allocation request header. In particular, for a system (mobile terminal) that uses its own DL measurement value or a multi-antenna, in order to request a change of MIMO mode or to deliver a measured weight value, the desired feedback type and the desired period of receiving feedback reports may be requested.

Figure 5:
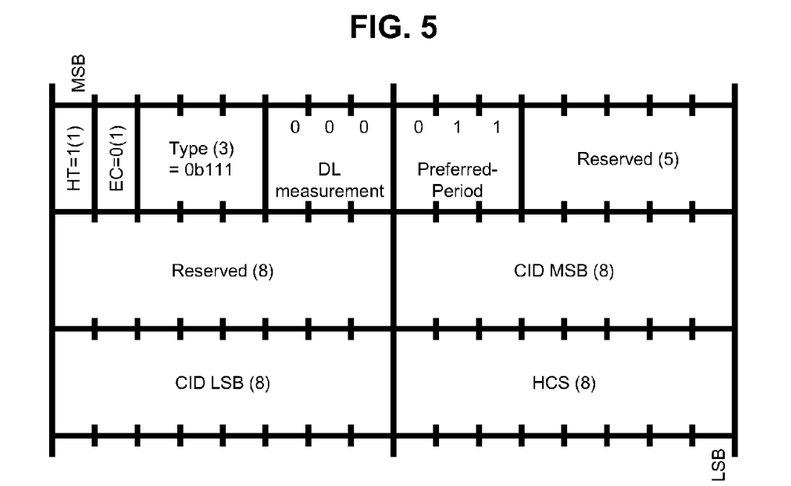
FIG. 5 shows an exemplary structure of the header that may be sent by the mobile terminal if the SNR value is to be reported at a period of 8 frames, in accordance with one embodiment.

FIG. 5 shows an exemplary structure of the header that may be sent by the mobile terminal if the SNR value is to be reported at a period of 8 frames. In the DL measurement desired for reporting, the desired 8-frame period is included. Here, the period is calculated by using $2^P$, whereby the P value is the Preferred-Period value.

Figure 6:
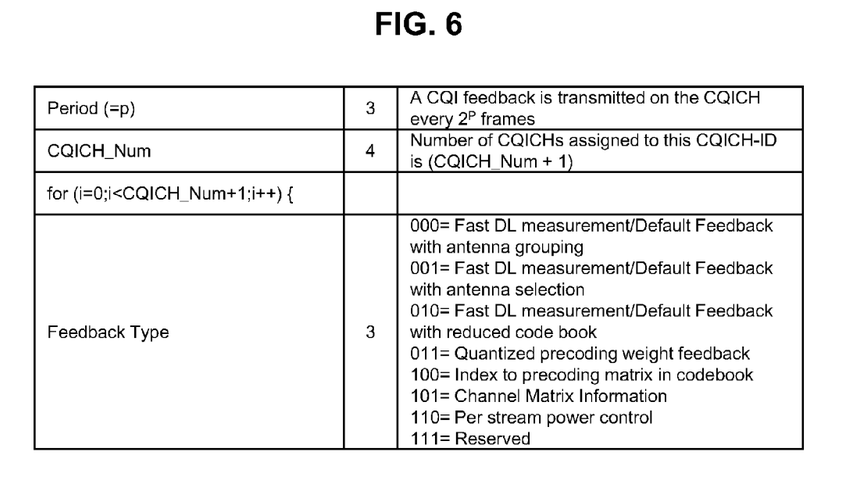
FIG. 6 shows an exemplary CQICH allocation request header that informs the requested bandwidth is informed through use of the CQICH_Enhanced_Allocation IE and the CQICH_Allocation IE, in accordance with one embodiment.
Figure 7:
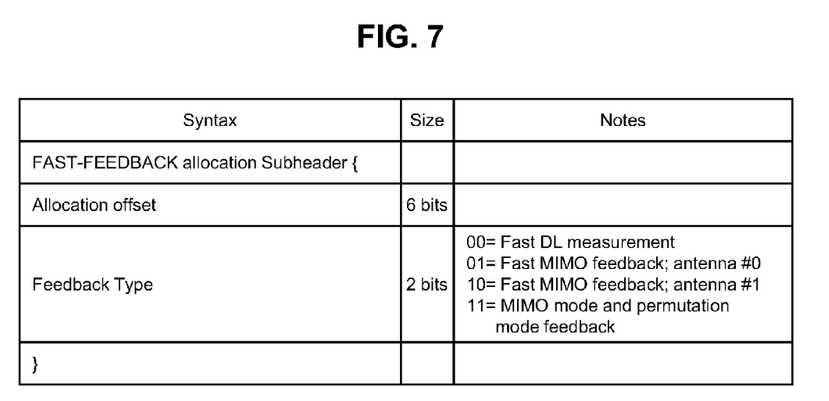
FIG. 7 shows an exemplary Fast-feedback allocation subheader that can be used if there is data to be sent to the mobile terminal, in accordance with one embodiment.

After receiving the CQICH allocation request header described above, the base station informs a mobile terminal that is within a CQICH (Fast-feedback channel) region, the amount of region (bandwidth) that the mobile terminal desires (for the case where the header structure that includes the number of CQICHs is included) or the feedback information to be received, and the requested bandwidth is informed through use of the CQICH_Enhanced_Allocation IE and the CQICH_Allocation IE, as shown in FIG. 6. Also, if there is data to be sent to the mobile terminal, the informing can be done through use of the Fast-feedback allocation subheader as shown in FIG. 7. In the case for supporting H-ARQ, a MIMO compact DL_MAP IE may be used.

Additionally, in order to change the previous period that was fixed, the mobile terminal may use the header of the present invention for making such request. For example, the value that was set for reporting at every 10 frames can be changed upon request to a faster report period (e.g., reporting at every 2 frames).

Figure 8:
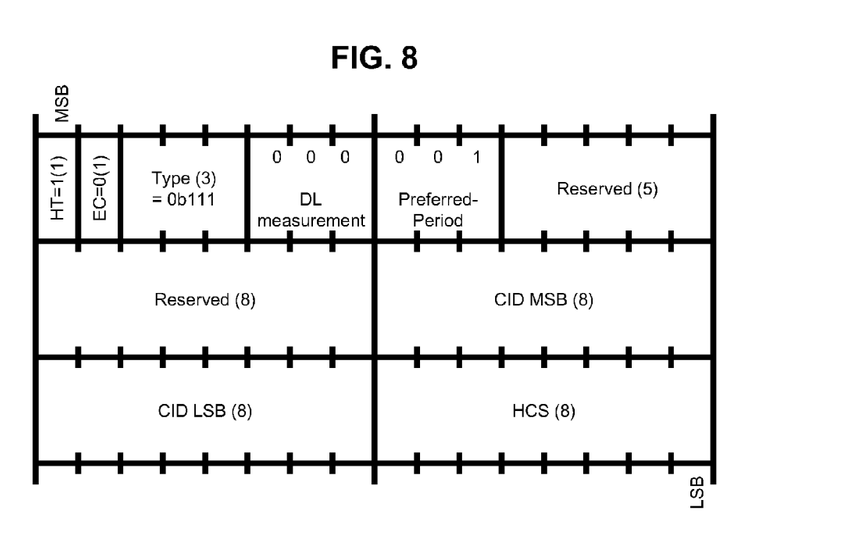
FIG. 8 shows an example of a header structure that can be used to request a previously set (fixed) feedback report period, in accordance with one embodiment.

FIG. 8 shows an example of a header structure that can be used to request a previously set (fixed) feedback report period. The header of FIG. 8 can be used when the previously set feedback type is maintained, but the preferred period is requested to be changed to reporting at every 2 frames ($=2^1$).

Figure 9:
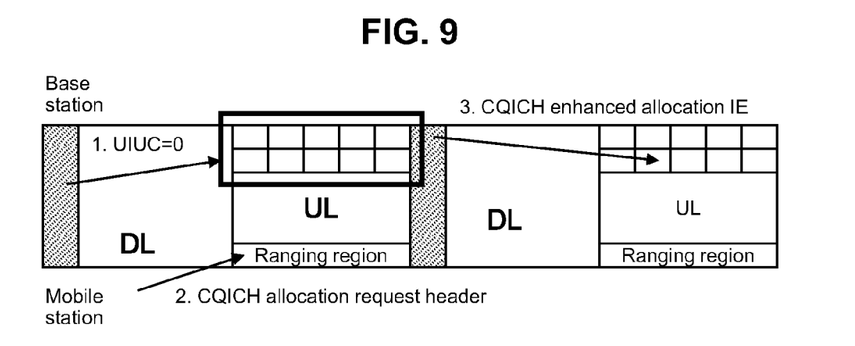
FIG. 9 is a schematic for further explaining how the CQICH allocation request according to one embodiment of the present invention can be performed.

FIG. 9 is a schematic for further explaining how the CQICH allocation request according to one embodiment of the present invention can be performed.

Through the use of a UL-MAP, the base station provides size and location information by using UIUC=0 in order to inform about the fast feedback channel region in the UL resources. All mobile stations then become aware of the fast feedback channel location, and when there is a request from the base station, the feedback value desired by the base station is sent at the designated location.

If there is no request from the base station, the mobile station employs the CQICH allocation request header when reporting the downlink signal strength or the weight values of each antenna of a multiple antenna system, when providing feedback of a channel matrix of the antenna, and when registering a new anchor base station. Here, the feedback type to be reported by the base station and report period desired by the mobile station are determined and sent. This header is a type of bandwidth request header used when UL resource allocation is desired, and is sent to the base station through the ranging region.

Upon receiving the CQICH allocation request header, the base station informs the mobile station about the location of the region to be reported, according to the desired period of the mobile station, by using a CQICH Enhanced allocation IE (Information Element) or a CQICH allocation IE, or a Fast-feedback allocation subheader (in case data exists). Also, for a mobile station that received a request from the base station to report feedback values at certain periods of time, this header may be used to change the report period.

In FBSS, the CQICH allocation request header is used to request allocation from the base station that is the target of handover, instead of being used to request allocation of a fast feedback channel from the base station that is currently providing service. The mobile station that performs FBSS is in a state of already being allocated a fast feedback channel from the base station that is currently providing service, and the fast feedback channel can be allocated ahead of time when moving to the target base station. However, if allocation ahead of time is not possible, the mobile station requests a new fast feedback channel by using this header.

3. Feedback Types

Figure 10:
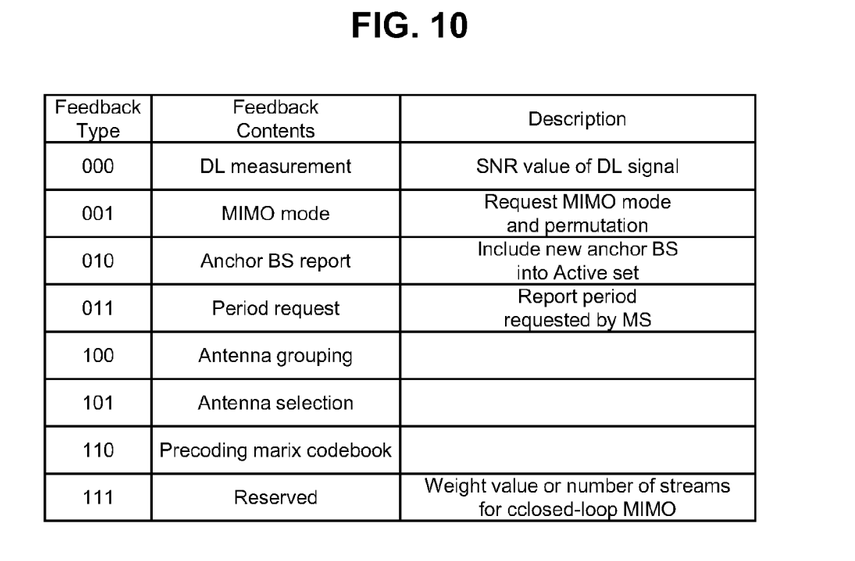
FIG. 10 shows some examples of the feedback types that the mobile station wishes to report without receiving any request from the base station, in accordance with one embodiment.
Figure 11:
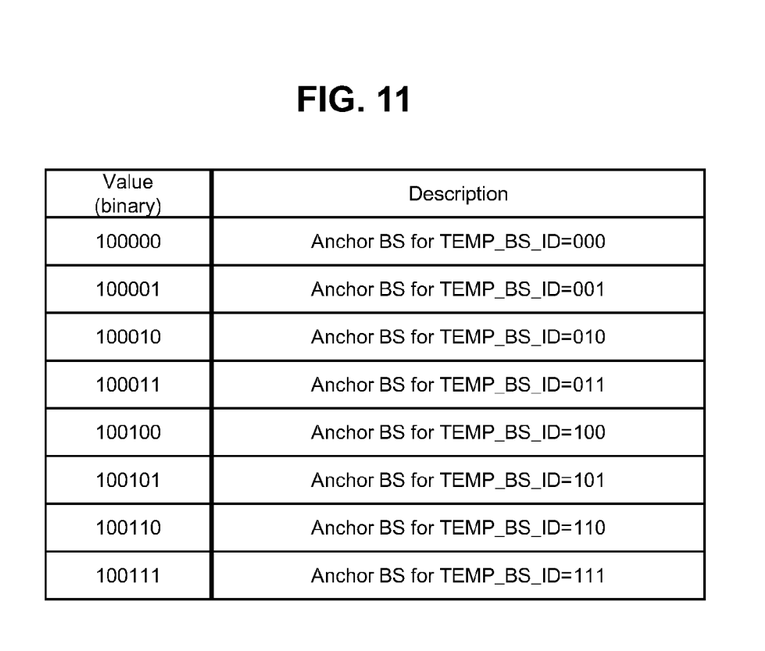
FIG. 11 shows exemplary values of a 6-bit payload use for selecting an anchor base station, in accordance with one embodiment.

FIGS. 10 and 11 show some examples of the feedback types that the mobile station wishes to report without receiving any request from the base station. Upon receiving a CQICH allocation request header that contains such feedback types, the base station designates the appropriate feedback type according to the region that has been allocated through the CQICH Enhanced allocation IE or the CQICH allocation IE or the fast-feedback allocation subheader. If periodic reporting is required, a fixed period value is also included.

Referring to FIG. 10, for example, the feedback type of 010 is used for FBSS (Fast Base Station Switching), which is a type of handover procedure. In FBSS, among the methods for updating a new anchor BS that has priority based upon signal strength measurements previously performed for an active BS (base station) set, there is a method in which the mobile station uses a fast-feedback channel. Unlike the other feedback types, when the mobile station sets 010 and sends the header, a fast-feedback channel bandwidth request is performed for reporting an anchor BS that is to be newly added to the active set.

FIG. 11 shows exemplary values of a 6-bit payload use for selecting an anchor base station. Namely, the allocated feedback bandwidth may have a payload that is fixed as 6 bits, whereby each value is determined according to the BS ID that is temporarily given.

Upon performing downlink signal measurements, the mobile station may employ the header of the present invention in order to report a pre-coding codebook index that was prepared by standardizing the antenna grouping and antenna selection that perform feedback of the antenna channel matrix, and the antenna weight values to be fed back, to report the antenna weight value, or to report the value indicating the number of signal streams.

The mobile station employs the header of the present invention if there are contents to be reported via the fast-feedback channel without any request from the base station. Here, the contents to be basically reported may include a downlink signal strength (SNR). Also, because the contents transferred from the mobile station may be delivered as a 6-bit or 4-bit codeword, the base station may can distinguish the reported contents according to the designated values in the received codeword.

Figure 12:
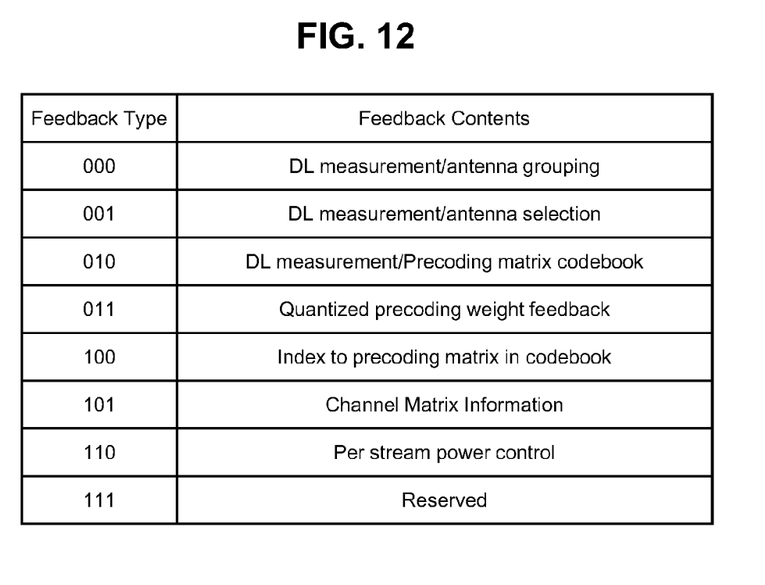
FIG. 12 shows exemplary feedback types of a CQICH enhanced allocation IE according to one embodiment of the present invention.

FIG. 12 shows exemplary feedback types of a CQICH enhanced allocation IE according to one embodiment of the present invention. For some feedback types, two types of feedback contents are indicated. This indicates that the same feedback type code (e.g., 000, 001, 010) may be applicable to different communication systems and techniques, to thus allow backward compatibility thereof 4. Applying a Subheader to a New CQICH Allocation Request The CQICH can be requested by using the (previous) known header type, while the present invention provides a method of using a subheader when data to be transmitted on the uplink exists.

Figure 13:
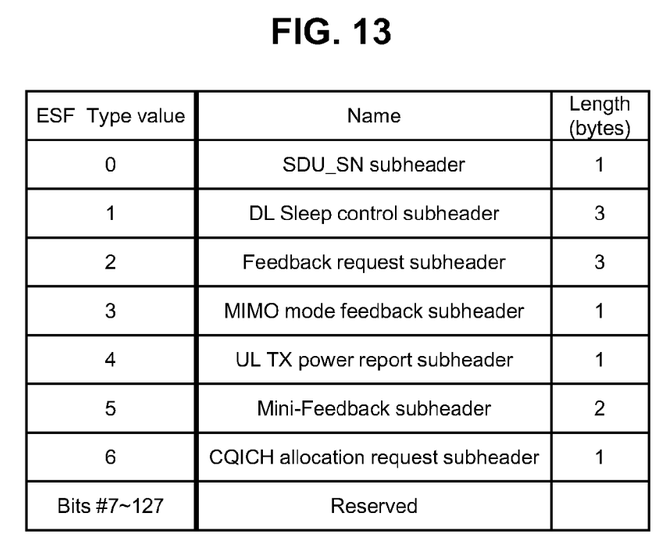
FIG. 13 is a table showing exemplary subheader structures used to inform about the existence of the CQICH allocation request, in accordance with one embodiment.

FIG. 13 is a table showing exemplary subheader structures, and such subheaders may be used to inform about the existence of the CQICH allocation request, while changes are necessary to the subheader type according to the contents thereof.

If feedback values to be reported through the CQICH exist, the mobile station may employ the known CQICH allocation request header, but if data to be transmitted exists, the request can be made through use of the subheader described above. The mobile terminal informs about the feedback type that it is to report, and the desired number of channel slots and desired period may also be reported. Upon receiving this subheader, the base station inform the mobile station about the bandwidth allocated thereto, by means of the CQICH Enhanced allocation IE and the CQICH allocation IE using the related art method in the same manner as receiving the related art header or by means of the fast-feedback allocation subheader together with the data to be sent to the mobile terminal.

Figure 14:
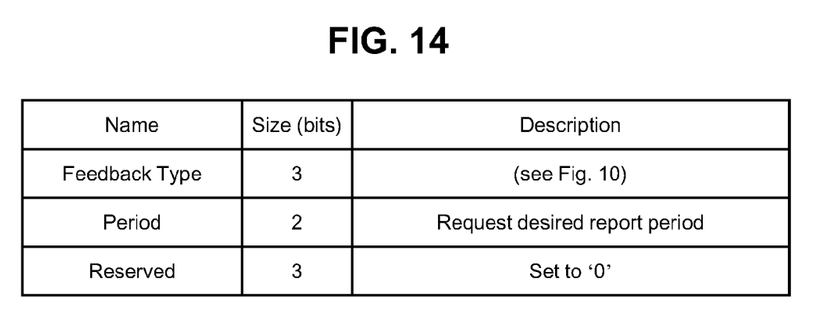
FIG. 14 shows an exemplary structure of a CQICH allocation request subheader according to one embodiment of the present invention.

FIG. 14 shows an exemplary structure of a CQICH allocation request subheader according to one embodiment of the present invention.

As for some desirable results and effects, it is possible to request bandwidth related to a fast-feedback channel through use of the bandwidth request header that had previously been only capable of being used to request uplink resource allocation in the related art. Also, waste of resources can be reduced due to more accurate resource allocation (instead of random or arbitrary allocation) by the base station that receives transmissions from the mobile station at a more accurate bandwidth determined according to the feedback type (e.g., slot numbers, CQICH number, etc.) that the mobile station wishes to report.

One embodiment of the invention provides a method of communicating feedback information between a mobile station and a base station, the method comprising: determining a need to request bandwidth allocation; providing information to a base station according to the determining, wherein the information indicates bandwidth allocation for a fast feedback channel, which is a robust channel; and performing communication with the base station upon bandwidth allocation according to the provided information.

Here, the provided information may further indicate a feedback type. The information may further indicate a time period related to providing a feedback report at certain time frames from the mobile station. The mobile station may calculate the time period. The time period may be initially requested or an adjustment of the time period may be later requested. The feedback report may include SNR information. The providing step may be performed if fast base station switching (FBSS) is performed. The FBSS may comprise a step of performing anchor base station updating. The step of providing information may be achieved by sending a MAC management header. The MAC management header may be a bandwidth request header.

The bandwidth request header may be a channel quality information channel (CQICH) allocation request header. The information may allow backward compatibility. The step of performing communication may comprise performing feedback with the base station according to the bandwidth allocation. The feedback type may be at least one of a group comprising downlink information or antenna information, pre-coding information, channel matrix information, and power control information. The fast feedback channel may be a channel quality information channel (CQICH). The steps may be applicable to at least one of OFDMA, OFDM, WiMAX, and 4 G communication systems.

One embodiment of the present invention also provides a method of communicating feedback information between a mobile station and a base station, the method comprising: determining whether bandwidth allocation is required; providing, to a base station according to the determining, information about bandwidth allocation for a robust channel used for feedback, and about a time period related to providing a feedback report to the base station at certain time frames; and performing communication with the base station upon bandwidth allocation according to the provided information.

The robust channel may be a fast feedback channel. The mobile station may calculate the time period. The time period may be initially requested or an adjustment of the time period is later requested. In one embodiment, a 6-byte protocol data unit (PDU) may be used for medium access control (MAC) management, the PDU comprising: a first byte containing information about a fast feedback channel; a second byte containing bits used for FSBB indication, a period indication, and reserved use; and additional bytes containing reserved bits, bits for CID and bits for HCS.

The first byte may additionally contain information about a feedback type. The first byte may comprise 3 bits that indicate a CQICH allocation request. The first byte may comprise 3 bits that indicate the feedback type. The second byte may comprise 4 bits that indicate the number of CQI channels. The second byte may comprise 1 bit that indicates fast base station switching. The second byte may comprise at least 3 bits that indicate a preferred feedback period.

One embodiment of the present invention provides a medium access control management header comprising: a first byte containing information related to a feedback channel and a feedback type; and additional bytes containing information related to at least a feedback period to be used when performing feedback via the feedback channel.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

An exemplary structure of a mobile station that supports the features of the present invention may be comprised of a transceiver to transmit and receive signals and data, a memory to store data therein, and a processor cooperating with the transceiver and memory to handle various required processing procedures. Here, the processor may include different hardware and/or software components (modules). An input unit (e.g., microphone, keypad, function buttons, touch-sensitive input device, etc. to allow audible, visual, and/or tactile inputs) and an output unit (e.g., speaker, display unit, touchscreen, vibration unit, etc. to provide audible, visual, and/or tactile outputs) are also part of the mobile terminal of the present invention.

As described thus far, those skilled in the art would understand that various substitutions, modifications, and changes are possible within the technical scope of the claimed subject matter, without being limited to the exemplary embodiments and attached Figures described herein.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of communicating feedback information between a mobile station and a base station, the method comprising:
   sending, to the base station, a Channel Quality Information Channel (CQICH) allocation request header to request a CQICH allocation, the CQICH allocation request header comprising a feedback type, a fast base station switching (FBSS) indicator and a preferred period;
   receiving, from the base station, CQICH allocation information; and
   sending, to the base station, the feedback information on an allocated CQICH.

2. The method of claim 1, wherein the CQICH allocation information is received via at least a CQICH_Allocation Information Element (IE), a CQICH_Allocation_Enhanced_Allocation Information Element (IE) or a fast-feedback allocation sub-header.

3. The method of claim 2, wherein the fast-feedback allocation sub-header includes a feedback type to indicate at least fast DL measurement, fast MIMO feedback or MIMO mode/permutation mode feedback.

4. The method of claim 2, wherein the fast-feedback allocation sub-header is used when data exists for transmission on a downlink.

5. The method of claim 1, wherein the feedback information is channel quality information (CQI).

6. The method of claim 1, wherein the feedback type comprises at least downlink signal strength, a downlink measurement/precoding matrix codebook, quantized precoding weight feedback, an index to a precoding matrix in a codebook or channel matrix information.

7. The method of claim 1, further comprising setting the FBSS indicator when the mobile station requests CQICH during FBSS handover.

8. The method of claim 1, wherein the CQICH allocation information is received in order to receive one or more CQICH channels.

9. A mobile station for transmitting feedback information to a base station, the mobile station configured to:
 send, to the base station, a Channel Quality Information Channel (CQICH) allocation request header to request a CQICH allocation, the CQICH allocation request header comprising a feedback type, a fast base station switching (FBSS) indicator and a preferred period;
 receive, from the base station, CQICH allocation information; and
 send, to the base station, the feedback information on an allocated CQICH.

10. The mobile station of claim 9, wherein the CQICH allocation information is received via at least a CQICH_Allocation Information Element (IE), a CQICH_Allocation_Enhanced_Allocation Information Element (IE) or a fast-feedback allocation sub-header.

11. The mobile station of claim 10, wherein the fast-feedback allocation sub-header includes a feedback type to indicate at least fast DL measurement, fast MIMO feedback or MIMO mode/permutation mode feedback.

12. The mobile station of claim 9, wherein the feedback information is channel quality information (CQI).

13. The mobile station of claim 9, wherein the feedback type comprises at least downlink signal strength, a downlink measurement/precoding matrix codebook, quantized precoding weight feedback, an index to a precoding matrix in a codebook or channel matrix information.

14. The mobile station of claim 9, wherein the FBSS indicator is set when the mobile station requests CQICH during FBSS handover.

* * * * *